US010496686B2

(12) United States Patent
Zhu et al.

(10) Patent No.: US 10,496,686 B2
(45) Date of Patent: Dec. 3, 2019

(54) METHOD AND SYSTEM FOR SEARCHING AND IDENTIFYING CONTENT ITEMS IN RESPONSE TO A SEARCH QUERY USING A MATCHED KEYWORD WHITELIST

(71) Applicant: Baidu USA LLC, Sunnyvale, CA (US)

(72) Inventors: Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 540 days.

(21) Appl. No.: 15/181,314

(22) Filed: Jun. 13, 2016

(65) Prior Publication Data

US 2017/0357712 A1 Dec. 14, 2017

(51) Int. Cl.
*G06F 16/00* (2019.01)
*G06F 16/31* (2019.01)
*H04L 29/06* (2006.01)
*G06F 16/951* (2019.01)

(52) U.S. Cl.
CPC .......... *G06F 16/328* (2019.01); *G06F 16/951* (2019.01); *H04L 63/101* (2013.01)

(58) Field of Classification Search
CPC ......... G06F 17/30631; G06F 17/30864; G06F 16/328; G06F 16/951; H04L 63/101
USPC ....................................................... 707/711
See application file for complete search history.

(56) References Cited

U.S. PATENT DOCUMENTS

| 7,984,500 B1* | 7/2011 | Khanna ................. G06F 21/552 709/225 |
| 8,108,252 B1* | 1/2012 | Mhatre .................. G06Q 30/02 705/14.1 |
| 8,285,745 B2* | 10/2012 | Li .......................... G06Q 30/02 707/776 |
| 8,745,018 B1* | 6/2014 | Singleton ............... G06F 3/048 707/705 |
| 8,788,514 B1* | 7/2014 | Ramanarayanan ... G06F 16/638 707/758 |
| 8,793,120 B1* | 7/2014 | Fliedner .............. G06F 17/2755 704/9 |
| 8,972,431 B2* | 3/2015 | Press ..................... G06F 16/243 707/759 |
| 9,084,025 B1* | 7/2015 | Gossweiler, III ..... G06F 16/489 |
| 9,436,766 B1* | 9/2016 | Buryak ................... G06F 16/35 |
| 9,600,568 B2* | 3/2017 | Rangan ............... G06F 16/3347 |

(Continued)

*Primary Examiner* — Thanh-Ha Dang
(74) *Attorney, Agent, or Firm* — Womble Bond Dickinson (US) LLP

(57) ABSTRACT

According to one embodiment, content keyword elements (CKEs) are determined based on content keywords (CKs) associated with content items. Query keyword elements (QKEs) are determined based on query keywords (QKs) associated with search queries. A first search query having one or more query keywords represented by a first QKE. A first content keyword represented by a first CKE that matches the first QKE is identified. A new entry in a query-to-CK (query/CK) whitelist table to map the first search query to the first content keyword. The query/CK whitelist table includes a number of entries, each entry mapping a search query to one or more content keywords. The query/CK whitelist table is utilized to identify content items in response to a subsequent search query.

22 Claims, 10 Drawing Sheets

(56) References Cited

U.S. PATENT DOCUMENTS

| | | | | |
|---|---|---|---|---|
| 9,613,003 | B1* | 4/2017 | Goodspeed | G06F 17/21 |
| 2004/0034853 | A1* | 2/2004 | Gibbons | G06F 8/61 |
| | | | | 717/174 |
| 2004/0186828 | A1* | 9/2004 | Yadav | G06F 16/951 |
| 2005/0251510 | A1* | 11/2005 | Billingsley | G06F 16/951 |
| 2006/0287986 | A1* | 12/2006 | Westphal | G06Q 30/0603 |
| 2007/0136248 | A1* | 6/2007 | Sarid | G06F 16/3344 |
| 2008/0177728 | A1* | 7/2008 | Bowman | G06Q 30/02 |
| 2008/0294607 | A1* | 11/2008 | Partovi | G06Q 30/00 |
| 2009/0234798 | A1* | 9/2009 | Shibata | G06F 16/313 |
| 2011/0167066 | A1* | 7/2011 | Picault | G06Q 10/06 |
| | | | | 707/737 |
| 2012/0226682 | A1* | 9/2012 | Li | G06Q 30/06 |
| | | | | 707/723 |
| 2012/0296891 | A1* | 11/2012 | Rangan | G06F 16/3347 |
| | | | | 707/722 |
| 2014/0280289 | A1* | 9/2014 | Marantz | G06F 16/2423 |
| | | | | 707/767 |
| 2014/0310748 | A1* | 10/2014 | Dureau | H04N 21/4622 |
| | | | | 725/41 |
| 2015/0149180 | A1* | 5/2015 | Lee | G06F 17/211 |
| | | | | 704/260 |
| 2015/0154266 | A1* | 6/2015 | Krishnan | G06F 16/951 |
| | | | | 707/722 |
| 2015/0172240 | A1* | 6/2015 | Back | G06F 16/951 |
| | | | | 715/752 |
| 2015/0363473 | A1* | 12/2015 | Liao | G06F 16/2455 |
| | | | | 707/722 |
| 2015/0379081 | A1* | 12/2015 | Lester | G06F 16/48 |
| | | | | 707/749 |
| 2016/0019620 | A1* | 1/2016 | Bajpai | G06F 16/532 |
| | | | | 705/26.62 |
| 2016/0189036 | A1* | 6/2016 | Shakeri | G09B 5/00 |
| | | | | 706/47 |
| 2017/0017622 | A1* | 1/2017 | Soundararajan | G06F 3/04842 |

* cited by examiner

300

| Query Keywords | Content Keywords |
|---|---|
| Fast ordering flower online | Flower delivery |
| Fast ordering flower online | Bejing flower delivery |
| How to order flower online | Flower delivery |
| How to order flower online | Bejing flower delivery |
| ... | ... |

FIG. 3

| Query Keywords | Content ID(s) |
|---|---|
| Keyword(s) 1 | Content item 1, content item 2 |
| Keyword(s) 2 | Content item 4, content item 6 |
| Keyword(s) 3 | Content item 11, content item 22 |
| ... | ... |

METHOD AND SYSTEM FOR SEARCHING AND IDENTIFYING CONTENT ITEMS IN RESPONSE TO A SEARCH QUERY USING A MATCHED KEYWORD WHITELIST

FIELD OF THE INVENTION

Embodiments of the present invention relate generally to searching content. More particularly, embodiments of the invention relate to searching content using a matched keyword whitelist in response to a search query.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating an example of query/CK whitelist table according to one embodiment.

FIG. 4 is a block diagram illustrating an example of a query/content mapping table according to one embodiment of the invention.

DETAILED DESCRIPTION

Figure 1A:
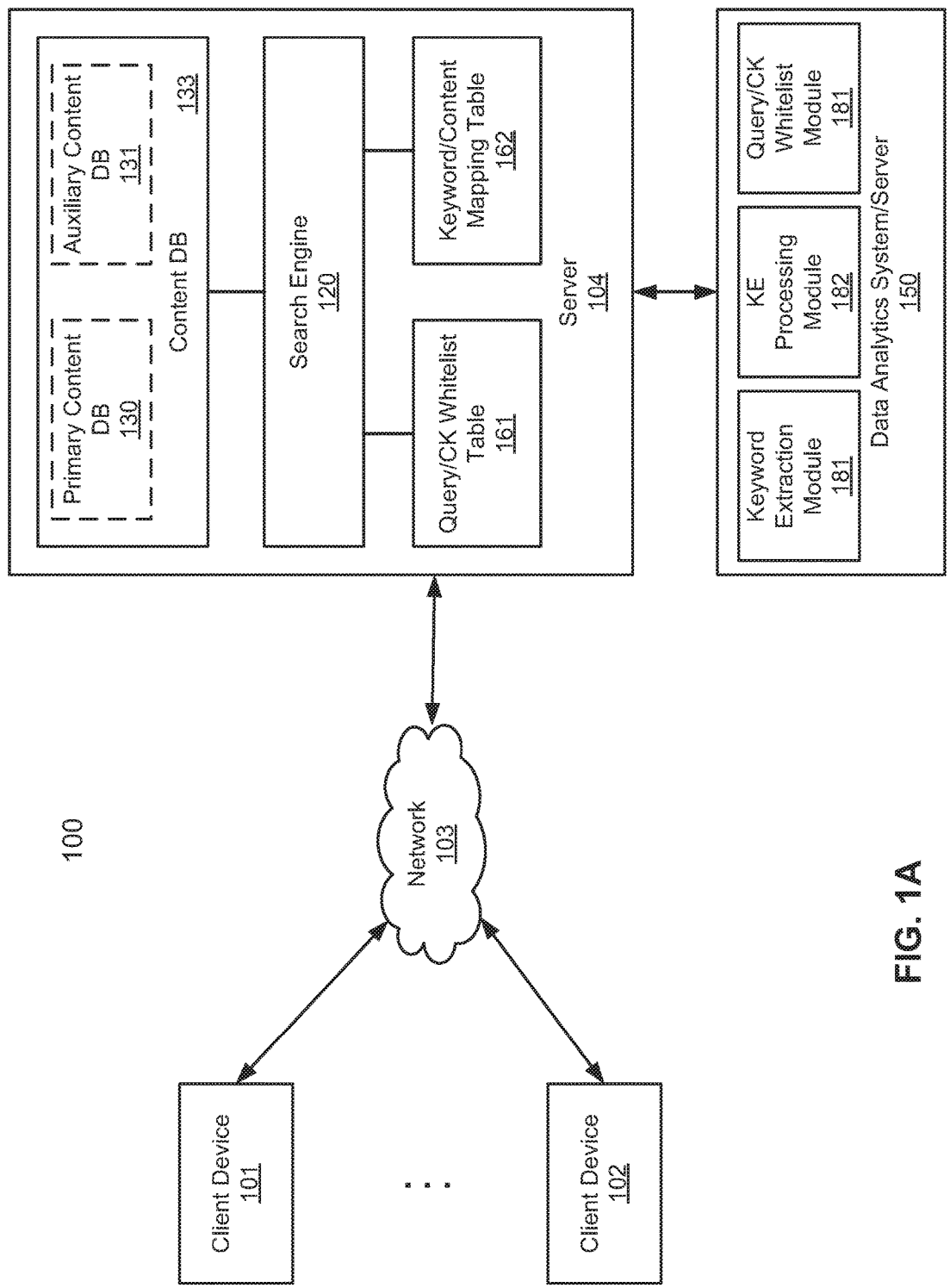
FIGS. 1A and 1B are block diagram illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a query-to-content keyword whitelist table is created to map certain search queries to certain content keywords associated with certain content items, based on an analysis of a set of known queries and known content items. Such tables can be created based on historic known search queries and content items offline. Thus, in addition to a normal query keyword (QK) to content keyword (CK) mapping or index table (QK/CK mapping table), the query/CK whitelist table provides additional whitelist mapping utilized to identify a list of content items in response to a search query in real-time or online.

In one embodiment, content keyword elements (CKEs), also referred to as content keyword features, are extracted from one or more CKs associated with each of content items in a known set. Query keyword elements (QKEs), also referred to as query keyword features, are extracted from one or more QKs associated with each of search queries in a known set. A first search query is identified that has one or more QKs represented by a first QKE of the QKEs. A first search query is identified that includes one or more QKs represented by a first QKE. A first CK represented by a first CKE is identified, where the first CKE matches the first QKE. A new mapping entry is created in the query/CK whitelist table to map the first search query to the first CK. The query/CK whitelist table is utilized, in addition to the QK/CK mapping table, to map a specific search query to one or more content keywords. The content keywords are utilized to identify one or more content items, which will be returned as part of a search result in response to the search query online.

In one embodiment, in determining CKEs, the content keywords are segmented into content sub-keywords, each content sub-keyword represents a CKE. An analysis such as a term frequency-inverse document frequency (TF-IDF) is performed on the content sub-keywords to remove one or more unrelated or the ones that appear more frequently. A latent semantic analysis may also be performed on the content sub-keywords to identify a set of similar content sub-keywords. A CKE index table is created to map a content keyword element to one or more content keywords, where the CKE index table is utilized to identify a content keyword based on a content keyword element. A QKE index table is created similarly. The CKE index table and the QKE index table are utilized to identify the common matched keyword elements to compile the query/CK whitelist table.

Figure 1B:
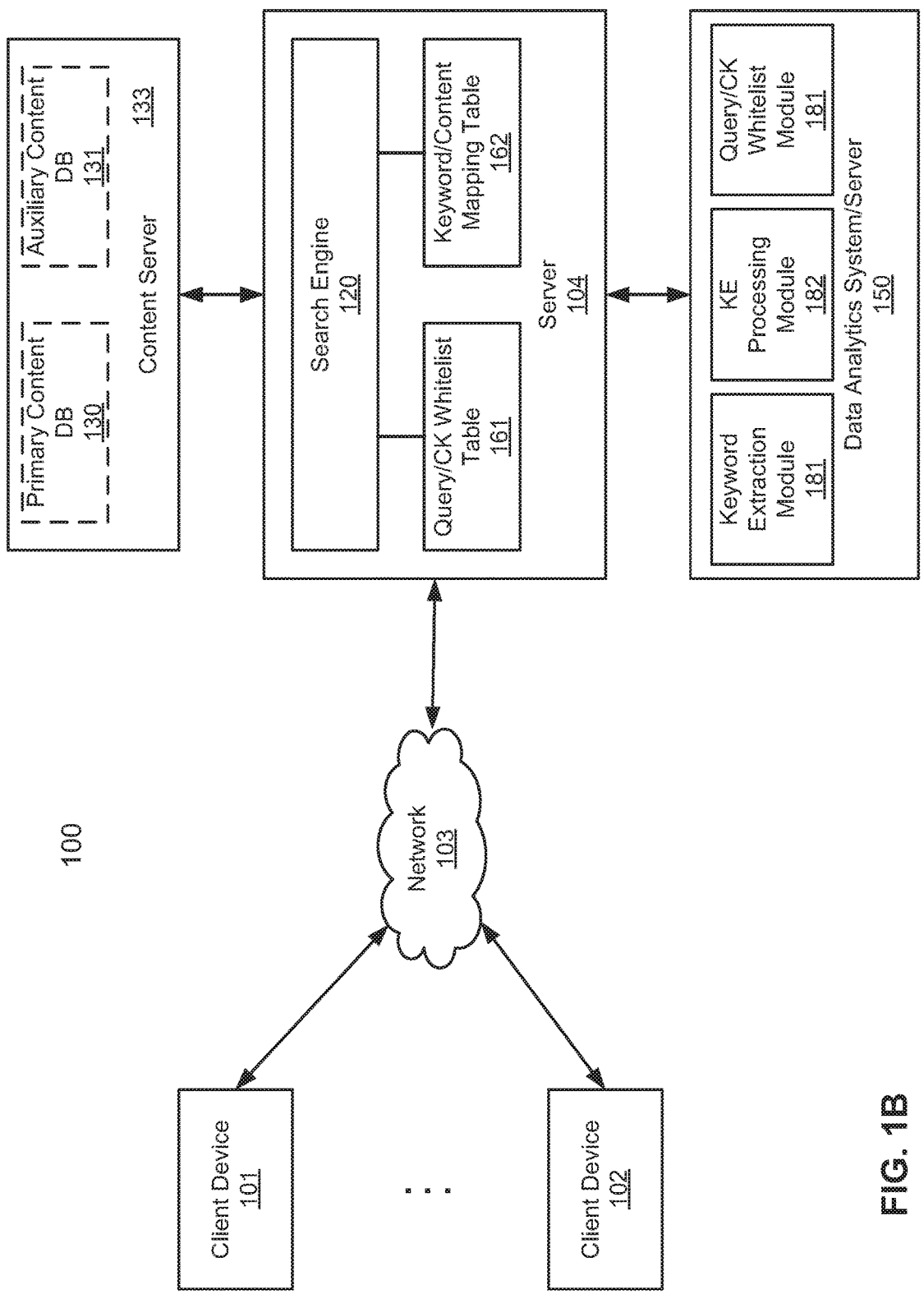

FIGS. 1A and 1B are block diagram illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or clusters of servers, such as Web or cloud servers, application servers, backend servers, or a combination thereof. In one embodiment, server 104 includes, but is not limited to, search engine 120, image selection module 110, and query/image matching rules 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In one embodiment, server 104 maintains query/CK whitelist table 161 and keyword to content (keyword/content) mapping table 162. Tables 161-162 may be created by data analytics system or server 150, which will be described in details further below. Query/CK whitelist table 161 includes a number of mapping entries, each mapping entry mapping at least a portion of a search query or query keywords to one or more content keywords. Keyword/content table 162 includes a number of mapping entries, each mapping entry mapping one or more keywords (e.g., content keywords) to one or more content items or content identifies (IDs) identifying the content items.

In response to a search query, for example, received from any of clients 101-102 over network 103, a search term or keyword is extracted from the search query. In addition, an analysis is performed on the query to determine one or more keywords associated with the query. The determined keywords may be the keywords included in the search query. The determined keywords may further include certain keywords that are semantically similar or have the same meaning of the keywords originally in the search query (e.g., synonymous words or phrases).

The search term or keywords are then used to look up in query/CK whitelist table to locate a mapping entry that matches the search term and to obtain one or more content keywords from the matching entry. The content keywords are then utilized to look up in keyword/content mapping table 162 (also referred to as a content index table) to obtain one or more content IDs. Based on the content IDs, a search is then performed in content database 133 to retrieve the related content items (e.g., sponsored content). Thereafter, a search result having at least some of the content items is then compiled and transmitted to the client.

In one embodiment, at least query/CK whitelist table 161 is created by data analytics system 150 offline based on a set of known queries and content items, for example, using a variety of machine-learning algorithms or models. Data analytics system 150 includes, but is not limited to, keyword extraction module 181, keyword element processing module 182, and query/CK whitelist processing module 183. Keyword extraction module 181 is to extract one or more keywords from a set of known search queries and a set of content items (e.g., Ads). Keyword element processing module 182 is to process the extract keywords to generate keyword elements. Query/CK processing module 183 is to compile a query/CK whitelist table, which becomes query/CK whitelist table 161 utilized online. Modules 181-183 will be described in details further below.

In addition, according to one embodiment, server 104 further includes an image selection module or system (not shown) to search and identify one or more mages in an image store based on the keywords associated with the search query that are related to the search query and/or the content items. In one embodiment, the images and their respective metadata stored in the image store may be obtained by one or more image crawlers that are designed to craw the networks to collect images as well as their surrounding metadata. The images may be non-privileged, non-copyrightable, properly licensed images, or any other authorized images. For each of the content items found in content database 133, an image is selected from the list of image candidates to be associated with the content item. The selected image may be incorporated with the content item to generate an incorporated content item. For example, the selected image may serve as a background image to the content item. The list of incorporated content items and images is returned to the client device as part of a search result.

In one embodiment, each of content items of a content database or content server is associated with a set of one or more keywords (or phrases, sentences). Such associated keywords, phrases, or sentences may be configured or specified by a content provider of the corresponding content item. The keywords, phrases, or sentences may be used for a searching purpose based on a search term for the purpose of identifying the corresponding content item in the content database or content server.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Data analytics system 150 may also be implemented as a separate server.

Other architectures or configurations may also be applicable. For example, as shown in FIG. 1B, content database 133 may be maintained and hosted in a separate server as a content server over a network. Content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary content server. Server 133 may be a Web server, an application server, or a backend server. Content server 133 and/or an image server may be organized and provided by the same entity or organization as of server 104. Alternatively, content server 133 and/or the image server may be maintained or hosted by separate entities or organizations (e.g., third-party providers).

Figure 2:
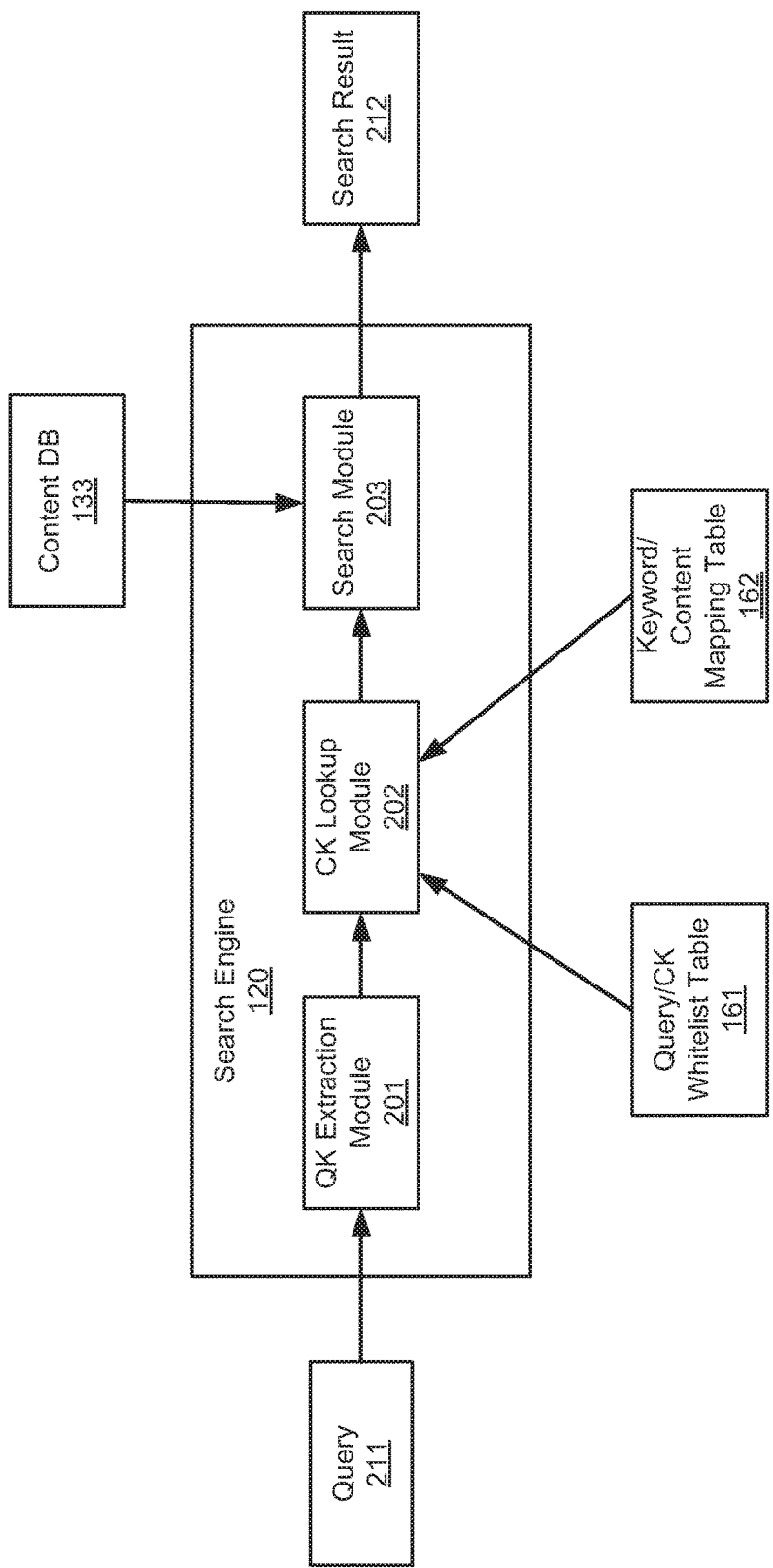
FIG. 2 is a block diagram illustrating an example of a content searching system according one embodiment of the invention.

FIG. 2 is a block diagram illustrating an example of a content searching system according one embodiment of the invention. System 200 may be implemented as part of system 100 as shown in FIGS. 1A-1B. Referring to FIG. 2, search engine 120 includes, but is not limited to, keyword extraction module 201, CK lookup module 202, and search module 203. In response to search query 211, keyword extraction module 201 extracts one or more keywords or phrases from search query 211. In addition, keyword extraction module 201 may perform an analysis, such as a latent semantic analysis, on the keywords to derive one or more similar or semantically related keywords or phrases (e.g., synonyms) to be added to the set of extracted keywords. Based on the keywords or phrases, CK lookup module 202 performs a lookup operation in query/CK whitelist table 161 to identify one or more content keywords.

FIG. 3 is a block diagram illustrating an example of query/CK whitelist table according to one embodiment. Query/CK whitelist table 300 includes a number of mapping entries. Table 300 may represent query/CK whitelist table 161. Referring to FIG. 3, each mapping entry maps one or more keywords or phrase 301 of a search query (e.g., previously known query) to one or more content keywords 302. Based on one or more keywords of the search query (e.g., search terms), CK lookup module 202 searches and find a mapping entry having field 301 matching the keywords of the search query. Content keywords 302 of the matching entry are obtained.

Based on the content keywords, for example, obtained via query/CK whitelist table 161, CK lookup module 202 searches in keyword/content mapping table 162 to identify one or more content IDs. FIG. 4 is a block diagram illustrating an example of a query/content mapping table according to one embodiment of the invention. Query/content table 400 may represent keyword/content mapping table 162. Query/content table 400 includes a number of mapping entries, each entry mapping one or more keywords 401 to one or more content IDs 402 that identify one or more content items. The content items may be the sponsored content items such as Ads and the keywords may be bidwords purchased by an advertiser as a content provider. Based on the content IDs, search module 203 searches in content database 133 to obtain a list of one or more content items (e.g., sponsored content items such as advertisements or Ads). Search result 212 is then generated including at least some of the content items and the search result is returned to the client.

Figure 5:
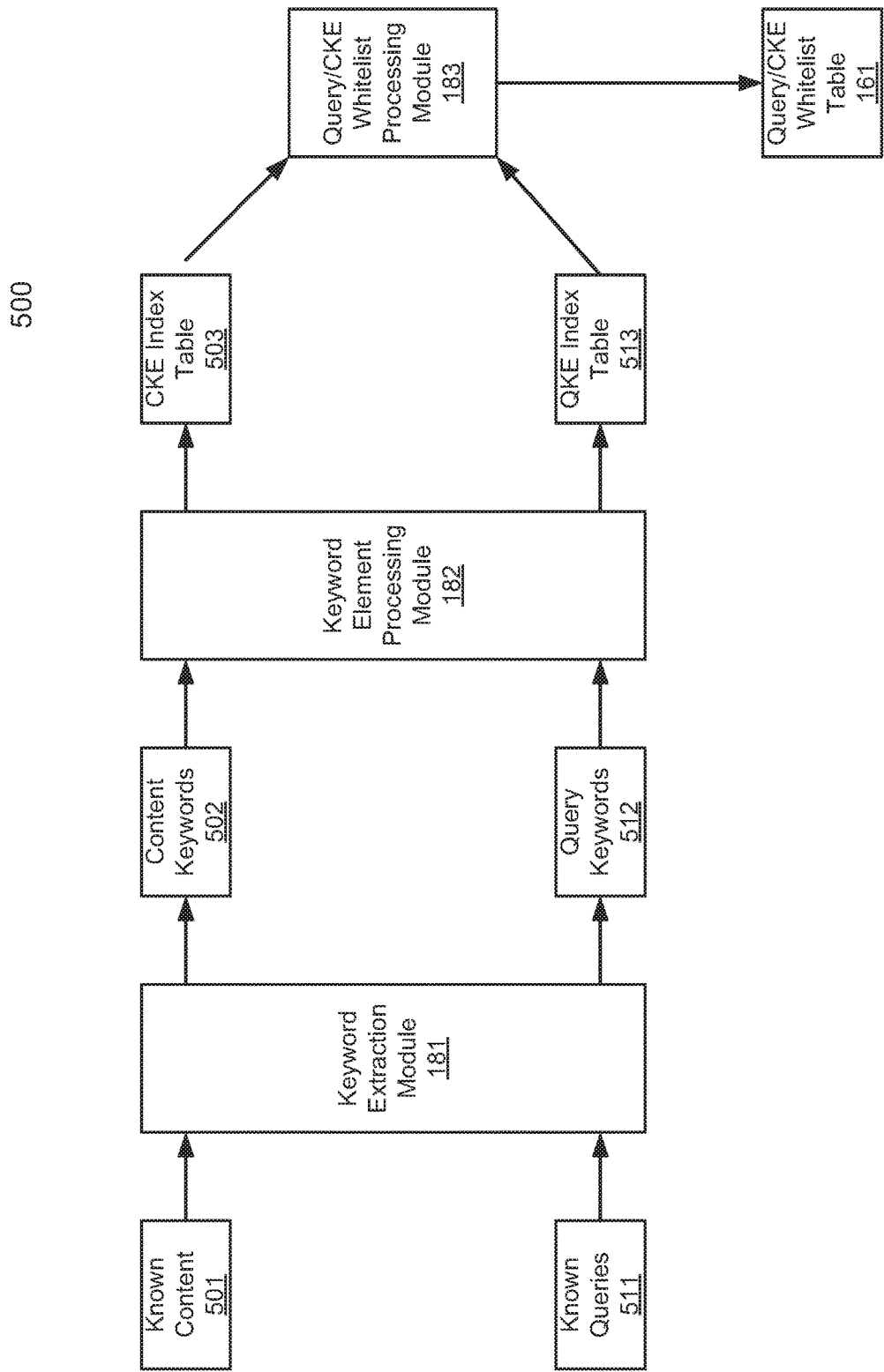
FIG. 5 is a block diagram illustrating an example of a data analytics system according to one embodiment of the invention.

FIG. 5 is a block diagram illustrating an example of a data analytics system according to one embodiment of the invention. System 500 may be implemented as part of data analytics system or server 150. Referring to FIG. 5, system 500 includes keyword extraction module 181, keyword element (KE) processing module 182, and query/CK processing module 183. These module can be implemented in software, hardware, or a combination thereof. For example, modules 181-183 can be loaded into a memory and executed by a processor.

In one embodiment, for each of content items 501 (e.g., sponsored content such as Ads) provided by certain content providers such as advertisers, keyword extraction module 181 performs an analysis on the content item and/or its associated keywords selected by the corresponding content provider (e.g., bidwords) to determine one or more content keywords or phrases 502. Keyword extraction module 181 may perform a latent semantic analysis on the content keywords to derive additional similar keywords that are related or semantically similar to the original keywords associated with the content item.

For each of the content keywords 503, KE processing module 182 segments content keywords 502 into sub-keywords. Optionally, KE processing module 182 calculates the word frequency of each sub-keyword. KE processing module 182 may also determines the function or meaning of each sub-keyword and orders them accordingly. For example, the sub-keywords may be ordered from high apparent frequency words to low apparent frequency words, verbs and nouns to adjectives and adverbs. The position of the order may be associated with a different weight factor in determining the importance and/or relevancy of the sub-keywords. KE processing module 182 may further perform a TF-IDF process on the sub-keywords to remove the unrelated or general words (e.g., "a," "an," "the," "and," etc.) A content keyword element (CKE) index table 503 (also referred to as a CKE/CK mapping table) is created. CKE index table 503 includes a number of mapping entries, each mapping entry mapping a CKE to one or more content keywords or phrases (e.g., bidwords). An example of CKE index table 503 is shown in FIG. 6A.

Similarly, the above processes are performed on a set of queries 511 to generate query keywords 512 by keyword extraction module 181, which are utilized to generate query keyword element (QKE) index table 513 (also referred to as a QKE/QK mapping table) by KE processing module 182. QKE index table 513 includes a number of mapping entries, each mapping entry mapping a QKE to one or more query keywords or phrases. An example of QKE index table is shown in FIG. 6B. Based on CKE index table 503 and QKE index table 513, query/CK whitelist processing module 183 merges the entries of CKE index table 503 and QKE table 513 to create query/CK whitelist table 161. The merged entries are the entries that have at least one common keyword element from their respective QKEs and CKEs. The query/CK whitelist table 161 includes a number of mapping entries, each mapping entry mapping a query keyword or phrase to a content keyword or phrase. An example of query/CK whitelist table 161 is shown in FIG. 3.

Figure 6A:
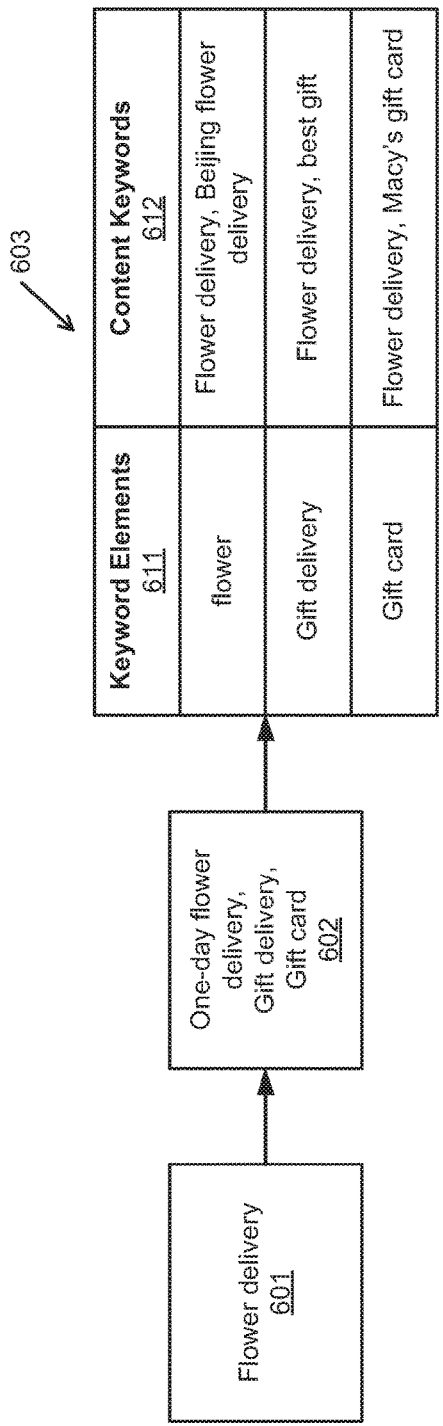
FIG. 6A is a block diagram illustrating an example of a content keyword element index table according to one embodiment.
Figure 6B:
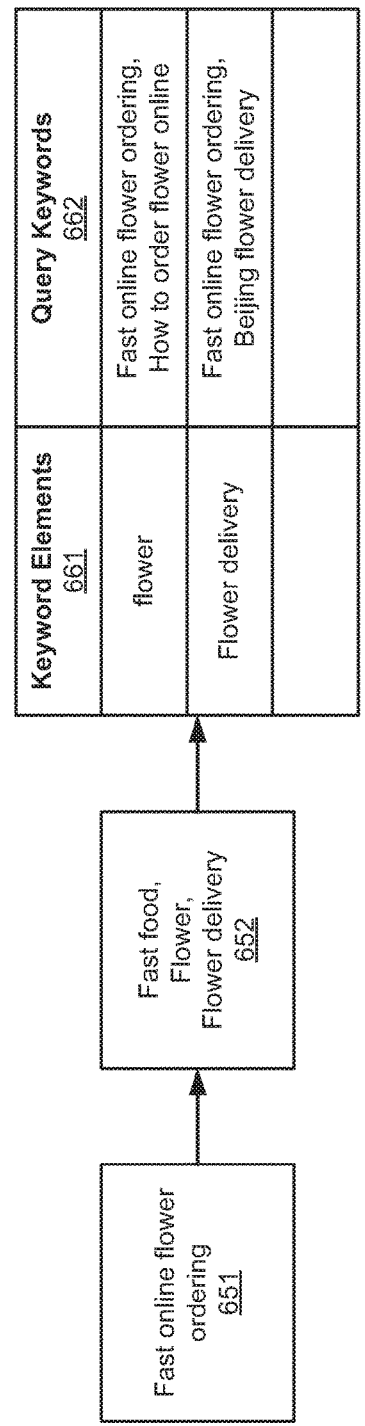
FIG. 6B is a block diagram illustrating an example of a query keyword element index table according to one embodiment.

Referring now to FIG. 6A, in this example, content keywords 601 includes "flower delivery," which may be extracted from a particular one of the known search queries. Content keywords 601 is analyzed by keyword extraction module 181, including performing a latent semantic analysis to derive additional similar or related keywords. The keywords are then processed by CK processing module 182 to generate content keyword elements 602. In this example, content keyword elements 602 include "one-day flower deliver," "gift delivery," and "gift card." CKE index table 603 is created to map each of the CKEs 611 to one or more keywords or phrases 612. In this example, keyword element "flower" is mapped to "flower deliver" and "Beijing flower deliver." Keyword element "gift delivery" is mapped to "flower delivery and "best gift." Keyword element "gift card" is mapped to "flower delivery" and "Macy's gift card." CKE index table 603 may be implemented as part of CKE index table 503 of FIG. 5.

Referring now to FIG. 6B, the similar process is performed on query keywords 651 of a set of known queries. In this example, query keywords include "fast online flower ordering." Query keywords 651 is processed to generate query keyword elements 652, in this example, including "fast food," "flower," and "flower delivery." CKE index table 653 is created to map each of the query keyword element 661 to one or more query keywords or phrases 662. CKE index table 653 may be implemented as part of CKE index table 513 of FIG. 5.

QKE index table 603 and CKE index table 653 are then merged based on the common keyword elements listed in field 611 of QKE index table 603 and field 661 of CKE index table 653. In this example, the common keyword element is "flower." As a result, each of the corresponding query keywords or phrases 662 is mapped to each of the corresponding content keywords or phrases 612, generating a query/CK whitelist table similar to the one as shown in FIG. 3. The query/CK whitelist table can be utilized online to map a particular search query to one or more content keywords or phrases (e.g., bidwords), which can be utilized to identify and retrieve one or more content items (e.g., sponsored content items such as Ads).

Figure 7:
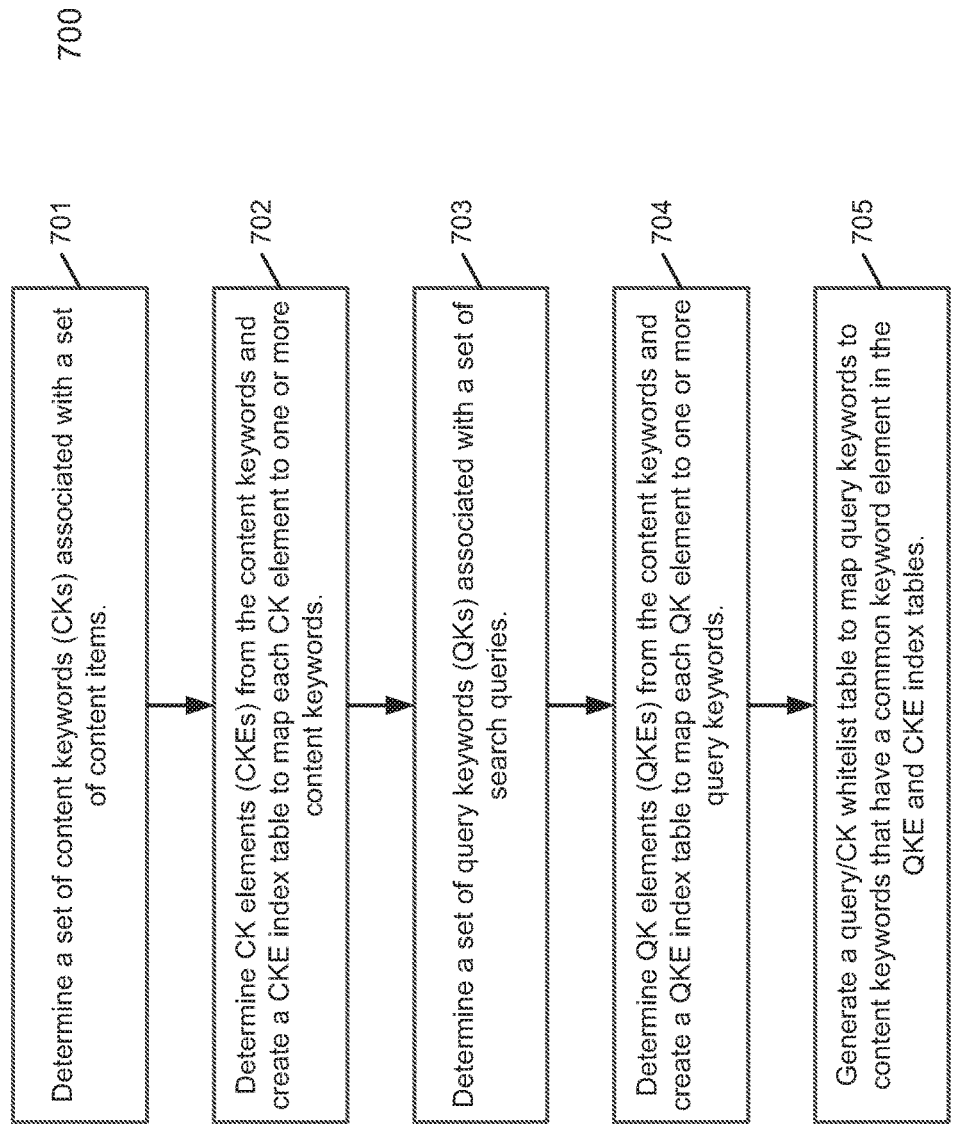
FIG. 7 is a flow diagram illustrating a process of generating a query to content keyword whitelist table according to one embodiment of the invention.

FIG. 7 is a flow diagram illustrating a process of generating a query to content keyword whitelist table according to one embodiment of the invention. Process 700 may be performed by processing logic which may include software, hardware, or a combination thereof. For example, process 700 may be performed by data analytics system 150 of FIGS. 1A and 1B. Referring to FIG. 7, at block 701, processing logic determines a set of content keywords (CKs) associated with a set of content items (e.g., sponsored content). At block 702, processing logic determines CK elements from the content keywords and creates a CK element index table to map each CK element to one or more content keywords. At block 703, processing logic determines a set of query keywords (QKs) associated with a set of known queries. At block 704, processing logic determines QK elements from the query keywords and create a QK element index table to map each query element to one or more query keywords. At block 705, a query/CK whitelist table is created to map each of the query keywords to one or more content keywords that have a common keyword element.

Figure 8:
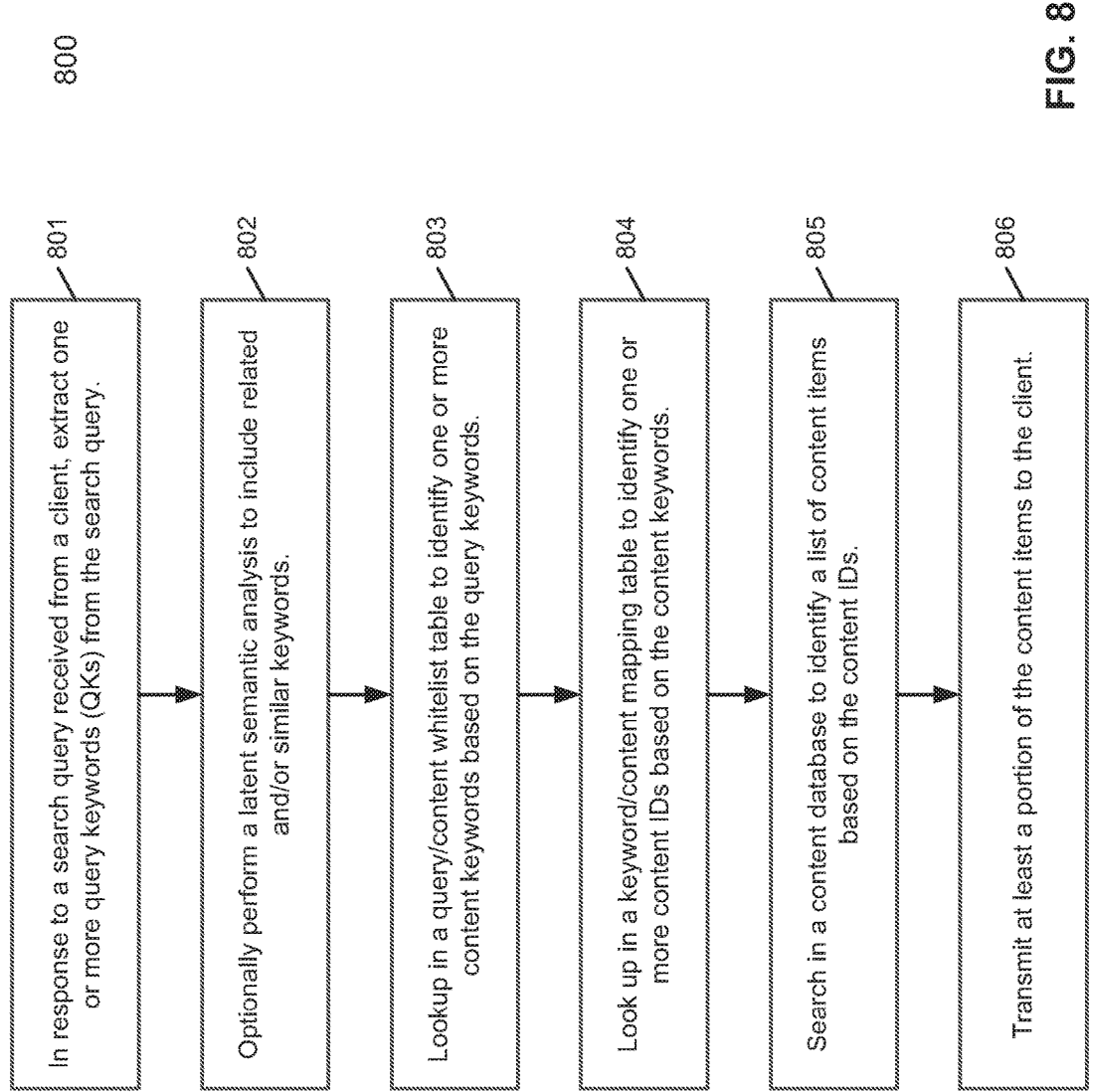
FIG. 8 is a flow diagram illustrating a process of content searching using a query to content keyword whitelist table according to one embodiment of the invention.

FIG. 8 is a flow diagram illustrating a process of content searching using a query to content keyword whitelist table according to one embodiment of the invention. Process 800 may be performed by processing logic which may include software, hardware, or a combination thereof. For example, process 800 may be performed by server 104 of FIGS. 1A and 1B. Referring to FIG. 8, at block 801, in response to a search query received from a client, processing logic extracts one or more query keywords (QKs) from the search query. At block 802, processing logic optionally performs a latent semantic analysis to include additional related or similar keywords. At block 703, processing logic looks up in a query/CK whitelist table to identify one or more content keywords based on the query keywords. At block 704, processing logic looks up in a CK/content mapping table to identify one or more content IDs based on the content keywords. At block 705, processing logic searches in a content database to identify and retrieve one or more content items based on the content IDs. At block 706, at least one of the content items is returned to the client.

The techniques described above can be applied to matching images with sponsored content. One type of the sponsored content is advertisement (Ads). For example, referring back to FIGS. 1A-1B, content database (DB) or server 133 may be an Ads database or Ads server. Each of the content items, e.g., Ads, is associated with a list of predefined keywords, terms, phrases, or sentences. These predefined keywords, terms, phrases, or sentences may be bidwords purchased, defined or specified by an Ads provider. In another embodiment, primary content DB 130 may store the general content generally available in a public network. Auxiliary content DB 131 may be an Ads DB. Server 104 may be a Web server for searching content or alternatively, server 104 may be an Ads server.

Figure 9:
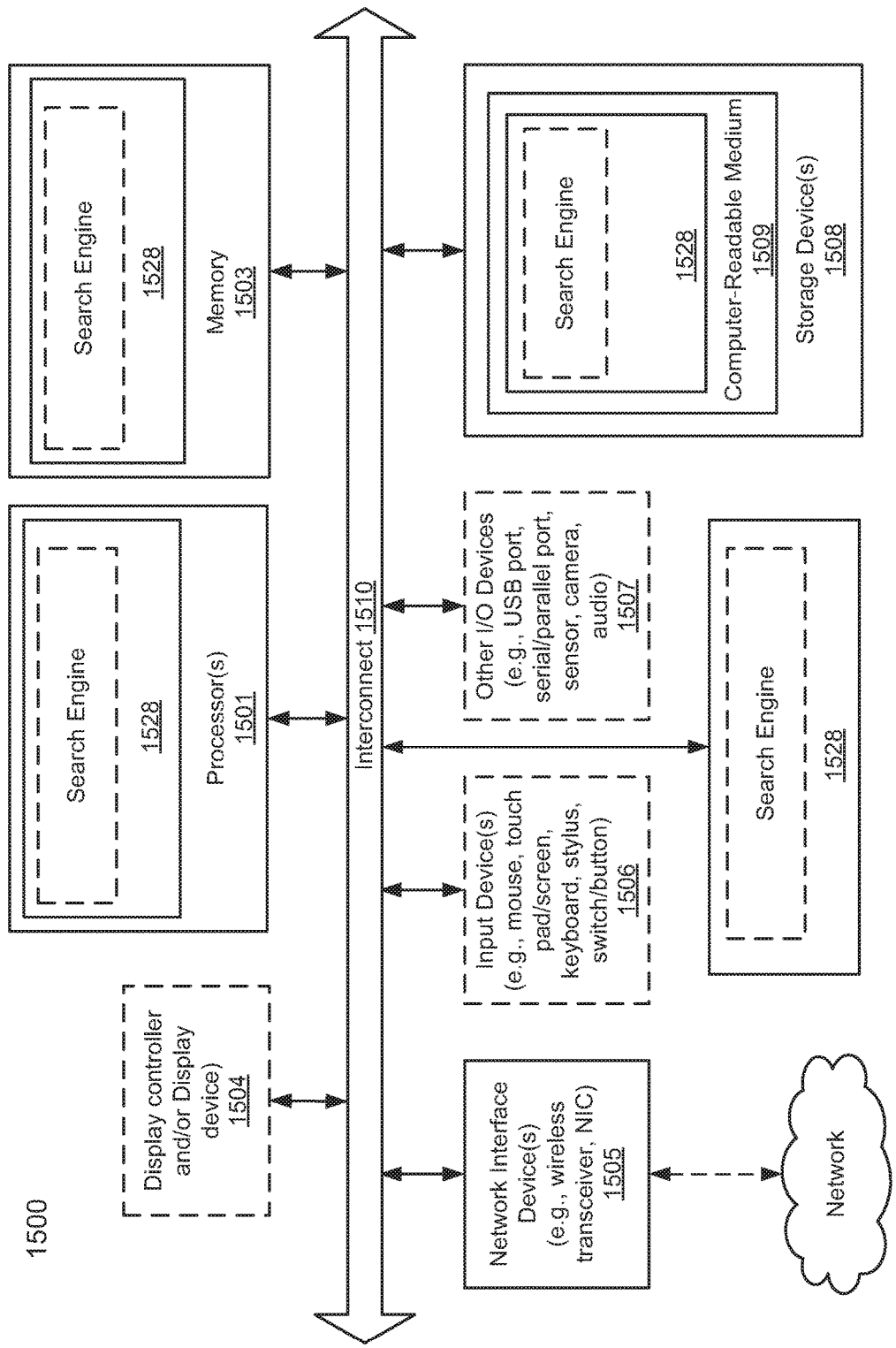
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, a client device or a server described above, such as, for example, server 104, content server 133, content/image mapping system/server 150, or image search engine/system/server 605, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for searching content, the method comprising:
providing, on a server with a search engine running thereon, a first mapping table and a second mapping table, the first mapping table including mappings between content keywords (CKs) and content identifiers, and the second mapping table including mappings between query keywords (QKs) and the CKs,
wherein the first mapping table is created by the server that performs one or more operations, including
determining a plurality of content keyword elements (CKEs) based on a plurality of CKs associated with a plurality of content items, and
wherein the second mapping table is created by the server that performs one or more operations, including
determining a plurality of query keyword elements (QKEs) based on a plurality of QKs associated with a plurality of historical search queries,
identifying a first historical search query having one or more query keywords represented by a first QKE,
identifying a first content keyword represented by a first CKE that matches the first QKE, and
creating a new entry in the second mapping table to map the first search query to the first content keyword;
in response to a search query received by the search engine from a client, extracting one or more keywords from the search query;
for each of the one or more keywords extracted from the search query, determining one or more synonymous words;
performing, by the search engine, a first lookup operation in the second mapping table using the extracted keywords and the determined synonymous words to obtain one or more mapping content keywords;
performing, by the search engine, a second lookup operation in the first mapping table using the one or more content keywords to obtain one or more mapping content identifiers;
performing, by the search engine based on the one or more content identifiers, a third lookup operation in a content database on the server to retrieve one or more content items;
for each of the one or more content items, selecting an image to be associated with the content item to create an incorporated content item, the incorporated content item including the image as a background image to the content item; and
returning, by the search engine, the one or more incorporated content items as part of a search result of the search query to the client.

2. The method of claim 1, wherein determining a plurality of content keyword elements (CKEs) based on a plurality of content keywords (CKs) comprises:
segmenting the content keywords into a list of a plurality of content sub-keywords, each content sub-keyword representing a content keyword element;
performing a term frequency-inverse document frequency (TF-IDF) analysis on the content sub-keywords to remove one or more content sub-keywords that appear frequently.

3. The method of claim 2, further comprising:
performing a latent semantic analysis on the content sub-keywords to identify a set of one or more similar content sub-keywords; and
adding the one or more similar content sub-keywords to the list of content sub-keywords to be analyzed.

4. The method of claim 3, further comprising, for each of the content sub-keywords, creating a CKE index table, wherein the CKE index table includes a plurality of entries, each entry mapping a content keyword element to one or more content keywords, wherein the CKE index table is utilized to identify a content keyword based on a content keyword element.

5. The method of claim 1, wherein determining a plurality of query keyword elements (QKEs) based on a plurality of query keywords (QKs) comprises:
segmenting the query keywords into a list of a plurality of query sub-keywords, each representing a query keyword element;
performing a term frequency-inverse document frequency (TF-IDF) analysis on the query sub-keywords to remove one or more query sub-keywords that appear frequently.

6. The method of claim 5, further comprising:
performing a latent semantic analysis on the query sub-keywords to identifying a set of one or more similar query sub-keywords; and
adding the one or more query similar sub-keywords to the list of query sub-keywords to be analyzed.

7. The method of claim 6, further comprising, for each of the query sub-keywords, creating a QKE index table, wherein the QKE index table includes a plurality of entries, each entry mapping a query keyword element to one or more query keywords, wherein the QKE index table is utilized to identify a query keyword based on a query keyword element.

8. The method of claim 1, wherein the plurality of search queries is a set of known search queries that were received from a plurality of clients for searching content items over a period of time in the past.

9. A non-transitory machine-readable medium having instructions stored therein, which when executed by a processor, cause the processor to perform operations of searching content, the operations comprising:

providing, on a server with a search engine running thereon, a first mapping table and a second mapping table, the first mapping table including mappings between content keywords (CKs) and content identifiers, and the second mapping table including mappings between query keywords (QKs) and the CKs,
  wherein the first mapping table is created by the server that performs one or more operations, including determining a plurality of content keyword elements (CKEs) based on a plurality of CKs associated with a plurality of content items, and
  wherein the second mapping table is created by the server that performs one or more operations, including
    determining a plurality of query keyword elements (QKEs) based on a plurality of QKs associated with a plurality of historical search queries,
    identifying a first historical search query having one or more query keywords represented by a first QKE,
    identifying a first content keyword represented by a first CKE that matches the first QKE, and
    creating a new entry in the second mapping table to map the first search query to the first content keyword;
in response to a search query received by the search engine from a client, extracting one or more keywords from the search query;
for each of the one or more keywords extracted from the search query, determining one or more synonymous words;
performing, by the search engine, a first lookup operation in the second mapping table using the extracted keywords and the determined synonymous words to obtain one or more mapping content keywords;
performing, by the search engine, a second lookup operation in the first mapping table using the one or more content keywords to obtain one or more mapping content identifiers;
performing, by the search engine based on the one or more content identifiers, a third lookup operation in a content database on the server to retrieve one or more content items;
for each of the one or more content items, selecting an image to be associated with the content item to create an incorporated content item, the incorporated content item including the image as a background image to the content item; and
returning, by the search engine, the one or more incorporated content items as part of a search result of the search query to the client.

10. The non-transitory machine-readable medium of claim 9, wherein determining a plurality of content keyword elements (CKEs) based on a plurality of content keywords (CKs) comprises:
  segmenting the content keywords into a list of a plurality of content sub-keywords, each content sub-keyword representing a content keyword element;
  performing a term frequency-inverse document frequency (TF-IDF) analysis on the content sub-keywords to remove one or more content sub-keywords that appear frequently.

11. The non-transitory machine-readable medium of claim 10, wherein the operations further comprise:
  performing a latent semantic analysis on the content sub-keywords to identify a set of one or more similar content sub-keywords; and
  adding the one or more similar content sub-keywords to the list of content sub-keywords to be analyzed.

12. The non-transitory machine-readable medium of claim 11, wherein the operations further comprise, for each of the content sub-keywords, creating a CKE index table, wherein the CKE index table includes a plurality of entries, each entry mapping a content keyword element to one or more content keywords, wherein the CKE index table is utilized to identify a content keyword based on a content keyword element.

13. The non-transitory machine-readable medium of claim 9, wherein determining a plurality of query keyword elements (QKEs) based on a plurality of query keywords (QKs) comprises:
  segmenting the query keywords into a list of a plurality of query sub-keywords, each representing a query keyword element;
  performing a term frequency-inverse document frequency (TF-IDF) analysis on the query sub-keywords to remove one or more query sub-keywords that appear frequently.

14. The non-transitory machine-readable medium of claim 13, wherein the operations further comprise:
  performing a latent semantic analysis on the query sub-keywords to identifying a set of one or more similar query sub-keywords; and
  adding the one or more query similar sub-keywords to the list of query sub-keywords to be analyzed.

15. The non-transitory machine-readable medium of claim 14, wherein the operations further comprise, for each of the query sub-keywords, creating a QKE index table, wherein the QKE index table includes a plurality of entries, each entry mapping a query keyword element to one or more query keywords, wherein the QKE index table is utilized to identify a query keyword based on a query keyword element.

16. The non-transitory machine-readable medium of claim 9, wherein the plurality of search queries is a set of known search queries that were received from a plurality of clients for searching content items over a period of time in the past.

17. A data processing system, comprising:
  a processor; and
  a memory coupled to the processor to store instructions, which when executed by the processor, cause the processor to perform operations of searching content, the operations including
    providing, on a server with a search engine running thereon, a first mapping table and a second mapping table, the first mapping table including mappings between content keywords (CKs) and content identifiers, and the second mapping table including mappings between query keywords (QKs) and the CKs,
    wherein the first mapping table is created by the server that performs one or more operations, including determining a plurality of content keyword elements (CKEs) based on a plurality of CKs associated with a plurality of content items, and
    wherein the second mapping table is created by the server that performs one or more operations, including
      determining a plurality of query keyword elements (QKEs) based on a plurality of QKs associated with a plurality of historical search queries, identifying a first historical search query having one or more query keywords represented by a first QKE, identifying a first content keyword represented by a first CKE that matches the first QKE, and creating a new entry in the second mapping table to map the first search query to the first content keyword;

in response to a search query received by the search engine from a client, extracting one or more keywords from the search query;

for each of the one or more keywords extracted from the search query, determining one or more synonymous words;

performing, by the search engine, a first lookup operation in the second mapping table using the extracted keywords and the determined synonymous words to obtain one or more mapping content keywords;

performing, by the search engine, a second lookup operation in the first mapping table using the one or more content keywords to obtain one or more mapping content identifiers;

performing, by the search engine based on the one or more content identifiers, a third lookup operation in a content database on the server to retrieve one or more content items;

for each of the one or more content items, selecting an image to be associated with the content item to create an incorporated content item, the incorporated content item including the image as a background image to the content item; and returning, by the search engine, the one or more incorporated content items as part of a search result of the search query to the client.

18. The data processing system of claim 17, wherein determining a plurality of content keyword elements (CKEs) based on a plurality of content keywords (CKs) comprises:

segmenting the content keywords into a list of a plurality of content sub-keywords, each content sub-keyword representing a content keyword element;

performing a term frequency-inverse document frequency (TF-IDF) analysis on the content sub-keywords to remove one or more content sub-keywords that appear frequently.

19. The data processing system of claim 18, wherein the operations further comprise:

performing a latent semantic analysis on the content sub-keywords to identify a set of one or more similar content sub-keywords; and adding the one or more similar content sub-keywords to the list of content sub-keywords to be analyzed.

20. The data processing system of claim 19, wherein the operations further comprise, for each of the content sub-keywords, creating a CKE index table, wherein the CKE index includes a plurality of entries, each entry mapping a content keyword element to one or more content keywords, wherein the CKE index table is utilized to identify a content keyword based on a content keyword element.

21. The data processing system of claim 17 wherein determining a plurality of query keyword elements (QKEs) based on a plurality of query keywords (QKs) comprises:

segmenting the query keywords into a list of a plurality of query sub-keywords, each representing a query keyword element;

performing a term frequency-inverse document frequency (TF-IDF) analysis on the query sub-keywords to remove one or more query sub-keywords that appear frequently.

22. The data processing system of claim 21, wherein the operations further comprise:

performing a latent semantic analysis on the query sub-keywords to identifying a set of one or more similar query sub-keywords; and adding the one or more query similar sub-keywords to the list of query sub-keywords to be analyzed.

* * * * *